United States Patent
Kwon et al.

(10) Patent No.: US 9,628,862 B2
(45) Date of Patent: *Apr. 18, 2017

(54) PORTABLE PHONE AND METHOD FOR PROVIDING INCOMING MESSAGE NOTIFICATIONS DURING VIDEO OPERATIONS THEREOF

(71) Applicant: Samsung Electronics Co., Ltd., Gyeonggi-do (KR)

(72) Inventors: Dae-Heon Kwon, Kyongsangbuk-do (KR); Yang-Muk Kang, Kyongsangbuk-do (KR); Won-Seok Kang, Kyongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,343

(22) Filed: Sep. 14, 2015

(65) Prior Publication Data
US 2016/0007088 A1    Jan. 7, 2016

Related U.S. Application Data

(63) Continuation of application No. 13/647,914, filed on Oct. 9, 2012, now Pat. No. 9,137,354, which is a continuation of application No. 09/467,210, filed on Dec. 20, 1999, now abandoned.

(30) Foreign Application Priority Data

Dec. 19, 1998  (KR) .................. 10-1998-0056487
Nov. 30, 1999  (KR) .................. 10-1999-0054007

(51) Int. Cl.
H04N 21/478    (2011.01)
H04N 21/414    (2011.01)
(Continued)

(52) U.S. Cl.
CPC ............ *H04N 21/478* (2013.01); *H04M 1/57* (2013.01); *H04M 1/575* (2013.01); *H04M 1/576* (2013.01);
(Continued)

(58) Field of Classification Search
CPC ........... H04N 21/478; H04N 21/41407; H04N 21/4126; H04N 5/44; H04N 2007/145;
(Continued)

(56) References Cited

U.S. PATENT DOCUMENTS 4,377,729 A  3/1983  Stacy
4,427,847 A  1/1984  Hofmann et al.
(Continued)

FOREIGN PATENT DOCUMENTS

DE  197 00 500  1/1997
JP  8-125723  5/1996
(Continued)

OTHER PUBLICATIONS

German Office Action dated Nov. 10, 2003 issued in counterpart application, namely, Appln. No. 199 61 067.3-31.

*Primary Examiner* — Hoang-Vu A Nguyen-Ba
(74) *Attorney, Agent, or Firm* — The Farrell Law Firm, P.C.

(57) ABSTRACT

A TV phone is provided, which includes a TV module; an MRFU for demodulating an incoming call received through a forward channel, and modulating and transmitting a signal on a reverse channel; a TV control section for supplying a tuning signal to the TV module; an MSP for establishing a phone or TV mode; and a display unit for displaying synchronized signals on an image viewing screen. In a TV mode, the TV phone receives an incoming call, stops the TV module; switches off and on output of an audio signal of the selected TV broadcasting channel; displays a character mes-
(Continued)

sage on the TV viewing screen; or superimposes a graphic image over the image on the TV viewing screen.

25 Claims, 3 Drawing Sheets

(51) Int. Cl.

| | | |
|---|---|---|
| H04W 4/12 | (2009.01) | |
| H04M 1/725 | (2006.01) | |
| H04N 21/41 | (2011.01) | |
| H04M 3/42 | (2006.01) | |
| H04M 1/57 | (2006.01) | |
| H04N 5/44 | (2011.01) | |
| H04N 7/14 | (2006.01) | |

(52) U.S. Cl.
CPC ... *H04M 1/72522* (2013.01); *H04M 1/72533* (2013.01); *H04M 1/72597* (2013.01); *H04M 3/42042* (2013.01); *H04N 5/44* (2013.01); *H04N 21/4126* (2013.01); *H04N 21/41407* (2013.01); *H04W 4/12* (2013.01); *H04N 2007/145* (2013.01)

(58) Field of Classification Search
CPC ............... H04W 4/12; H04M 1/72533; H04M 3/42042; H04M 1/576; H04M 1/72597; H04M 1/575; H04M 1/57; H04M 1/72522
USPC ......... 386/248, 299; 725/62, 106, 133, 141, 725/153; 348/14.01, 553, 725, 739; 379/142.04, 142.16; 340/7.56; 455/414.4, 556.1

See application file for complete search history.

(56) References Cited

U.S. PATENT DOCUMENTS

| | | |
|---|---|---|
| 4,456,925 A | 6/1984 | Skerlos et al. |
| 4,465,902 A | 8/1984 | Zato |
| 4,591,661 A | 5/1986 | Benedetto et al. |
| 4,873,712 A | 10/1989 | Porco |
| 4,933,963 A | 6/1990 | Sato et al. |
| 5,005,013 A | 4/1991 | Tsukamoto et al. |
| 5,054,055 A | 10/1991 | Hanle et al. |
| 5,056,153 A | 10/1991 | Taniguchi et al. |
| 5,117,449 A | 5/1992 | Metroka et al. |
| 5,502,727 A | 3/1996 | Catanzaro et al. |
| 5,684,918 A * | 11/1997 | Abecassis ............... A63F 13/10 348/14.01 |
| 5,764,864 A | 6/1998 | Sujita |
| 5,835,578 A | 11/1998 | Reyes et al. |
| 5,890,071 A | 3/1999 | Shimanuki |
| 6,038,367 A * | 3/2000 | Abecassis ............... A63F 13/10 348/E5.102 |
| 6,078,581 A | 6/2000 | Shtivelman et al. |
| 6,141,058 A | 10/2000 | Lagoni et al. |
| 6,169,789 B1 | 1/2001 | Rao et al. |
| 6,243,596 B1 | 6/2001 | Kikinis |
| 6,459,906 B1 | 10/2002 | Yang |
| 6,529,742 B1 | 3/2003 | Yang |
| 6,538,660 B1 | 3/2003 | Celi et al. |
| 6,714,723 B2 * | 3/2004 | Abecassis ............... A63F 13/10 348/E5.102 |
| 6,912,688 B1 | 6/2005 | Zhou et al. |
| 7,149,506 B2 | 12/2006 | Osterhout et al. |
| 7,257,158 B1 | 8/2007 | Figueredo et al. |
| 7,509,142 B2 | 3/2009 | Ditzik |
| RE42,928 E | 11/2011 | Yang |
| 2001/0040887 A1 | 11/2001 | Shtivelman et al. |
| 2001/0055978 A1 | 12/2001 | Herrod et al. |
| 2002/0187777 A1 | 12/2002 | Osterhout et al. |
| 2003/0052964 A1 | 3/2003 | Priestman et al. |
| 2005/0240962 A1 * | 10/2005 | Cooper .................. G10L 21/04 725/38 |
| 2011/0302615 A1 | 12/2011 | Helferich |

FOREIGN PATENT DOCUMENTS

| | | |
|---|---|---|
| JP | 2000-151832 | 11/1998 |
| KR | 97-55875 | 7/1997 |
| WO | WO 93/01685 | 1/1993 |

* cited by examiner

PORTABLE PHONE AND METHOD FOR PROVIDING INCOMING MESSAGE NOTIFICATIONS DURING VIDEO OPERATIONS THEREOF

PRIORITY

This application is a continuation of, and claims priority under 35 U.S.C. §120 to, U.S. Pat. No. 9,137,354, which issued on Sep. 15, 2015, was filed as U.S. patent application Ser. No. 13/647,914 in the U.S. Patent and Trademark Office on Oct. 9, 2012, and was a continuation of, and claimed priority under 35 U.S.C. §120 to, U.S. patent application Ser. No. 09/467,210, which was filed in the U.S. Patent and Trademark Office on Dec. 20, 1999 and claimed priority under 35 U.S.C. §119(a) to Korean Pat. App. Ser. Nos. 1998-56487 and 1999-54007, which were filed in the Korean Intellectual Property Office on Dec. 19, 1998 and Nov. 30, 1999, respectively, the entire disclosures of all of which are incorporated herein by reference.

BACKGROUND OF THE INVENTION

1. Field of the Invention

The present invention relates to a hand-held portable cellular telephone, and more particularly to an integrally combined television (TV) and portable cellular phone (hereinafter, referred to as "TV phone").

2. Description of the Related Art

In recent years, rapid and widespread use of portable cellular telephones as an ordinary personal communication appliance in society has driven the desire of users toward development of the portable phone with a variety of additional functions besides making simple conversation. For example, portable phones are being developed with a calculating function, a biorhythm checking function, and other functions, including the capability of transmitting/receiving television images as well as a video camera image. The term "TV phone" herein refers to a wireless portable cellular phone, which allows for watching a television (TV) broadcast program through a displaying unit in the portable phone in addition to the capability of cordless telephone conversation.

In order to receive TV broadcasts, a portable phone should be equipped with two radio frequency units. The reason for this is that a frequency bandwidth necessary for transmitting/receiving telephony messages (i.e., audio and data) for the portable phone is different from that for a TV broadcast. The operational status of the portable TV phone is classified into a phone mode, a waiting mode, and a TV mode. The TV mode is also used both as a waiting mode and as an image-receiving mode.

Because the TV phone should allow a user to watch and hear images and audio of a television broadcast program received in the TV mode through the display unit, i.e. a Thin Film Transistor (TFT) Liquid Crystal Display (LCD), and the speaker or earphone of the TV phone, it cannot use the method employed by a general portable phone to inform a user of an incoming call or an incoming character message, while in the TV mode state.

That is, there is no method of immediately informing the user of the occurrence of an incoming call or an incoming character data message when the TV phone is being used to watch and listen to a television broadcast program.

There is therefore a need for a portable TV phone that rapidly and accurately informs a user that there is an incoming call or character data message when the user is viewing a TV broadcast program.

A TV phone is disclosed in Korean Patent Application No. 95-46026, filed on Dec. 1, 1995 (published on Jul. 31, 1997), entitled "A COMBINED TV RECEIVER AND CELLULAR PHONE" of LG Electronics Inc. However, the TV phone in the prior art discloses technology for controlling separately the operations of the transmitter/receiver of the cellular phone and the TV receiver by using only a microprocessor, but no technology for processing a character message such as short message service (SMS). Also, it is impossible to switch the operational mode when an incoming call occurs during the viewing of a TV broadcast program in the TV mode. Accordingly, when an incoming call occurs during the watching of a TV, the transmitter/receiver of a cellular phone is operated separately, thereby increasing consumption of a battery, and causing inconvenience in switching of the operational mode from the TV mode to the phone mode. That is, a user suffers inconvenience having to perform a switching off of a TV and a switchover of the operational mode from the TV mode to the phone mode.

SUMMARY OF THE INVENTION

Therefore, an object of the present invention is to provide a portable TV phone designed to selectively allow for transmission or reception of an audio signal, as well as reception of a TV program.

It is another object of the present invention to provide a portable TV phone which effectively informs a user i.e., a called party, of the reception of any incoming call related message when the user receives the incoming call related message from a calling party.

It is another object of the present invention to provide a portable TV phone, which automatically activates preset incoming call alarm modes when the operational mode of the TV phone is switched from the phone mode to the TV mode.

In accordance with an embodiment of the present invention, these and other objects are accomplished by providing a TV phone in which a television and a portable cellular phone are integrally combined. The TV phone includes a TV module for receiving and demodulating a desired TV channel signal among radio-frequency electromagnetic signals received, in response to an input of a tuning signal, when the TV module operates by supply of a power supply voltage, to generate a composite video signal, a composite synchronizing signal and a composite audio signal; a Mobile Station Radio Frequency Unit (hereinafter, referred to as "MRFU") for demodulating a signal indicative of an incoming call received through a forward channel, for forming an audio conversion channel among the received radio-frequency electromagnetic signals to output the demodulated signal, and for modulating and transmitting a signal on a reverse channel; a TV control section for supplying the tuning signal corresponding to a channel selection command signal to the TV module, the TV control section synchronizing On Screen Display (OSD) data such as a font, a graphic etc., corresponding to display control data and display data such as an icon, with the composite synchronizing signal to output the synchronized signal as a video signal; a Mobile Station Processor, (hereinafter, referred to as "MSP") for establishing a phone mode/TV mode in response to an input command, generating a channel selection command signal stored in a predetermined memory area by setting the TV mode, supplying the display control data to the TV control section according to a preset incoming call alarm mode when receiving an incoming signal from the MRFU or interrupting a power supply voltage supplied to the TV module, and processing audio data outputted from the MRFU to output the processed audio data signal while supplying audio data to the MRFU; and a display unit for synchronizing the composite video signal and graphic video signal outputted from the TV module and the TV control section with the composite synchronizing signal and displaying the synchronized composite video signal and graphic video signal on a image viewing screen.

BRIEF DESCRIPTION OF THE DRAWINGS

The foregoing and other objects, features, and advantages of the present invention will become more apparent from the following detailed description when taken in conjunction with the accompanying drawings in which.

DETAILED DESCRIPTION OF EMBODIMENTS OF THE INVENTION

Reference will now be made in greater detail to various embodiments of the present invention. In the following description of the present invention, only portions necessary for understanding the operation of the present invention are set forth, and a detailed description of known functions and configurations incorporated herein will be omitted when it may obscure the subject matter of the present invention.

Figure 1:
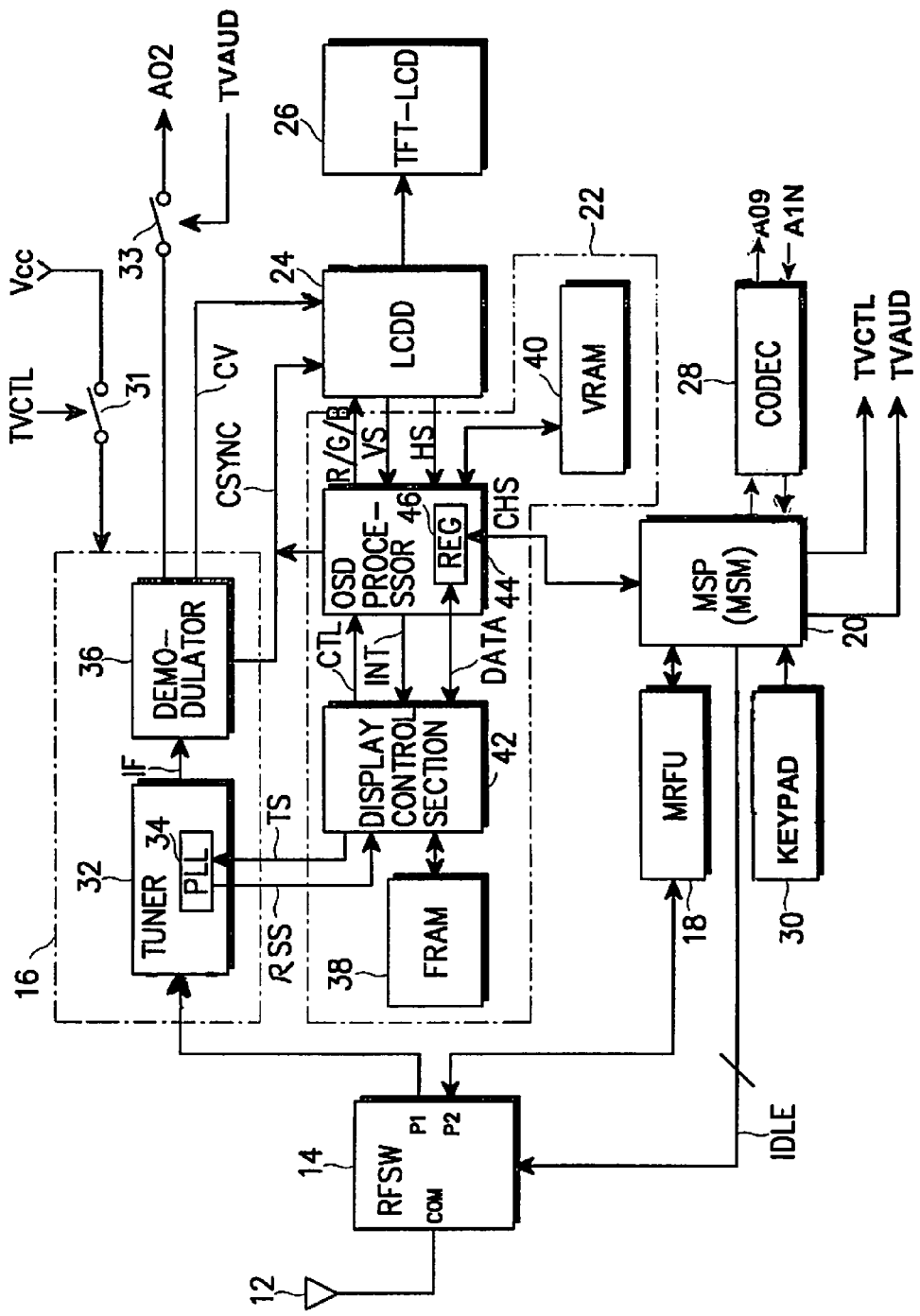
FIG. 1 is a block diagram illustrating the construction of a TV phone according to an embodiment of the present invention.

FIG. 1 is a block diagram illustrating the inner construction of a TV phone according to an embodiment of the present invention.

In FIG. 1, reference numeral 18 designates the MRFU, reference numeral 20 designates the MSP, and reference numeral 30 designates a keypad of the portable phone module. These components are incorporated in circuits applied to conventional portable digital cellular phones, such as CDMA type portable cellular phone, to implement the preferred embodiment of the present invention. The constructions and operations of the above components will be apparently understood by reference to the following detailed description.

Also, reference numeral 14 designates a radio frequency switch (RFSW), reference numeral 16 designates the TV module, reference numeral 22 designates the TV control section, reference numeral 24 designates an LCD driver (LCDD), and reference numeral 26 designates the TFT-LCD. Since generally the TFT-LCD cannot receive a composite video signal and display an image by itself, the LCDD separates the brightness signal, color signal, and synchronizing signal from the composite video signal, makes an RIG/B signal, and then outputs them in synchronization with the synchronizing signal.

The RFSW 14 has a circuit for switching an antenna 12 connected to a common terminal COM to both a first port P1 and a second port P2 or only to the second port P2.

That is, the RFSW 14 includes a first port P1 connected to the TV module 16 and a second port P2 connected to the MRFU 18. The RFSW 14 connects the second port P2 to the antenna 12 in response to an input of a control signal IDLE in a logic "low" state, or connects the first port P1 and the second port P2 to the antenna 12 in response to an input of a control signal IDLE in a logic "high" state. The RFSW 14 is provided with a circuit for not allowing a radio frequency signal inputted to the second port P2 to be applied to the first port P1.

The TV module 16 operates by an input of a power supply voltage Vcc supplied upon the "turning on" of a switch 31. The TV module 16 includes a tuner 32 for selecting only the TV channel signal corresponding to the input of a tuning signal CH-S among signals outputted from the first port P1 to down-convert the TV channel signal to an intermediate frequency signal IF, and a demodulator 36 for demodulating the intermediate frequency signal IF outputted from the tuner 32 to output a composite video signal CV, a composite synchronizing signal CSYNC and an audio signal AO2. The tuner 32 includes a Phase-Locked Loop (PLL) 34 for generating an associated tuning frequency in response to an input of the tuning signal CH-S, determining whether or not a phase is locked to the generated tuning signal, and outputting a receiving state signal RSS corresponding to a receiving field strength of the TV channel signal received.

The TV control section 22 includes a flash memory (FRAM) 38 for storing program data for controlling the TV module 16, font data and graphic data, such as an icon; a video memory (VRAM) 40 for storing text data and graphic data under control of the OSD in order to output the data as display images; a display control section 42 for inputting and analyzing data in response to an input of an interrupt signal INT, accessing the flash memory 38 and outputting the tuning signal TS, the text data and the graphic data corresponding to the analysis of the data from the flash memory 38, and controlling the tuning operation according to the receiving state signal RSS outputted from the TV module 16; an OSD processor 44 disposed between the MSP 20 and the display control section 42, for interfacing data therebetween and synchronizing the display related data outputted from the display control section 42 with a vertical synchronizing (VS) signal and horizontal synchronizing (HS) signal outputted from the LCDD 24 to output the synchronized display related data as display images through the video memory 40. The display control section 42 has an 8 bit-microprocessor unit MPU of one chip and a universal synchronous/asynchronous receiver/transmitter (UART) for communication of data included therein. Further, the OSD processor 44 includes a timing generator for generating a composite synchronizing signal, and a latch register for temporarily storing data, etc. The composite synchronizing signal is used when displaying the OSD data associated with the phone mode on the TFT-LCD 26 in a state in which the TV module is disabled.

First of all, suppose that the operational mode of the TV phone, as shown in FIG. 1, is set to the TV mode and one among the first, second and third incoming alarm modes is set as the alarm mode for an incoming call on the TV phone. For example, suppose that at least one among three incoming call alarm modes is set as the incoming call alarm mode. As stated above, the first incoming call alarm mode interrupts the power supply of the TV and switches the operational mode from the TV mode to the phone mode; the second incoming call alarm mode switches the TV audio outputted from the TV module; and the third incoming call alarm mode displays an incoming call character message or a preset graphic at a specific region on the TV image displaying screen. The incoming call alarm mode is set by using the keypad 30 as shown in FIG. 1. For example, the first incoming call alarm mode is a phone mode, the second incoming call alarm mode is a bell mode, and the third incoming call alarm mode is a mute or lamp mode, and these incoming call alarm modes are set by using the keypad.

As shown in FIG. 1, a radio-frequency, electromagnetic signal is received by an antenna 12, which converts the radio-frequency, electromagnetic signal into an electrical signal, which is supplied to a common terminal COM of an RFSW 14. The RFSW 14 allows the common terminal COM to be connected to both the first port P1 and the second port P2 or to be connected only to the second port P2 based on the logic level of a control signal outputted from the MSP 20. For example, when the operational mode of the TV phone is set to the TV mode, the MSP 20 enables the power supply control signal TVCTL to "turn on" switch 31 and makes the control signal IDLE become a logic "high" state. By this operation, when switch 31 is turned on, the TV module 16 is supplied with a power supply voltage Vcc so that it is in an operable state.

In such a state, the MSP 20 supplies the OSD processor 44 in the TV control section 22 with a channel selection command signal CHS. The user may select a channel by inputting from the keypad 30. The OSD processor 44 stores the channel selection command signal CHS inputted from the MSP 20 in a latch register 46 and generates an interrupt signal INT. In response to activation of the interrupt signal INT, the display control section 42 reads out data stored in the latch register 46 and analyzes if the interrupt signal INT is a command or general data. Determining whether a specific address bit or data bit transmitted from the MSP 20 is set performs this analysis. Meanwhile, the display control section 42 outputs a response signal ACK in response to the interrupt signal INT in order to release the interrupt of the OSD processor 44. By release of this interrupt, the OSD processor 44 sets the state of its latch register 46 to a free state.

By this operation, if the display control section 42 determines that data inputted from the OSD processor 44 is the channel selection command signal CHS, it accesses the flash memory 38 and outputs a tuning signal TS, which corresponds to the channel selection command signal CHS, from the flash memory 38 for application to the PLL 34 of the tuner 32 disposed in the TV module 16.

The PLL 32 in the TV module 16 oscillates a tuning frequency corresponding to the tuning signal for application to the TV tuner 32, which down-converts the corresponding TV channel signal among the radio-frequency electromagnetic signals outputted from the first port P1 of the RFSW 14 to an intermediate frequency signal IF for application to the demodulator 36.

The demodulator 36 connected to the tuner 32 is adapted to demodulate the intermediate frequency signal IF to output a composite video signal CV, a composite synchronizing signal CSYNC, and audio signal AO2 of the corresponding channel. The audio signal AO2 outputted from the demodulator 36 is reproduced either through an earphone (not shown) or a speaker (not shown), which is turned on by switch 33. At this time, the PLL 34 of the tuner 32 monitors that an oscillating frequency of a voltage controlled oscillator VCO is locked, and measures the receiving field strength of the selected channel to supply the receiving state signal RSS corresponding to the measured field strength to the display control section 42. The display control section 42 allows for an automatic channel search by using the voltage level of the receiving state signal RSS.

Meanwhile, the LCDD 24 allows an NTSC decoder included therein to separate the analog composite video signal CV into a color signal of R, G, and B, and synchronizes the separated color signal of R, G, and B with the composite synchronizing signal C SYNC for application to the TFT-LCD 26, which displays the synchronized color signal on a screen thereof. Also, the LCDD 24 synchronizes and separates the input composite synchronizing signal CSYNC to output a vertical synchronizing signal VS and a horizontal synchronizing signal HS. Therefore, when the operational mode of the TV phone is set to the TV mode, TV images are displayed on the screen of the TFT-LCD 26 while an audio signal AO2 is outputted under the control of the MSP 20.

Meanwhile, the MRFU 18 coupled to the antenna 12 through port P2 or RFSW 14 receives a radio-frequency, electromagnetic signal of a transmitting/receiving frequency bandwidth for a portable phone, converts an analog signal into a digital signal or converts a digital signal into an analog signal, and power-amplifies the converted signal to transmit it through the antenna 12. The MRFU 18 can be easily constructed by combining an RF unit and a baseband analog (BBA) circuit of a conventional portable phone. For example, the MRFU 18 can be embodied by combining a CDMA type radio transceiver unit, a chip of "BBA2.X (Q5312CDMA)" manufactured by QUALCOMM Co. as a BBA circuit for converting an analog signal into a CDMA type digital data and vice versa, and an RF unit. The RFSW 14 allows the common terminal COM to be connected to the second port P2 under the control of the MSP 20 as described above when the operational mode of the MRFU 18 is set either in wait mode or transmitting/receiving mode.

The MSP 20 coupled to the MRFU 18 analyzes commands supplied from the keypad 30 and generates control signals corresponding to the commands. Further, the MSP 20 performs or controls data signal processing operations such as demodulating, de-interleaving, decoding, and vocoding of the digital signal inputted thereto from the MRFU 18 so that it outputs the received forward channel data while outputting coded audio data as reverse channel data. A codec 28 coupled to the MSP 20 converts the forward channel coded audio data to an analog audio signal to output the converted audio signal (AO1) through a speaker or earphone, or codes an analog audio signal inputted thereto from a microphone (AIN) to supply the coded audio signal as an audio signal of a reverse channel to the MSP 20.

Figure 3A:
FIGS. 3A and 3B are schematic views illustrating a state in which the incoming call message is displayed on a screen of a display unit of the TV phone according to an embodiment of the present invention.
Figure 3B:
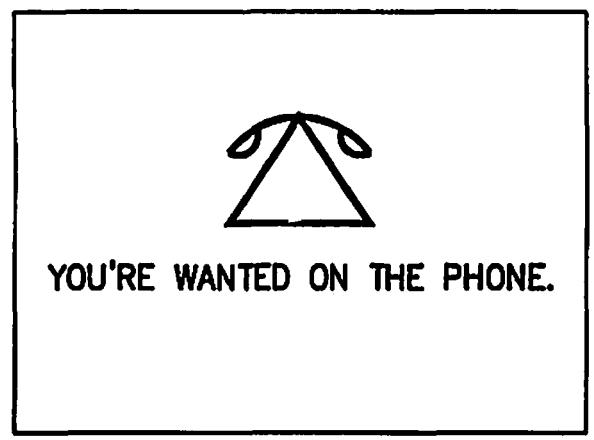

In addition, the MSP 30 informs a user watching a TV program of an incoming call by controlling the incoming call modes as shown in FIGS. 3A and 3B through analysis of the incoming call alarm modes set in an inner memory if the received forward channel data message is a message associated with an incoming call. The MSP 30 may selectively use "MSM2300" of a one-chip type supplied from QUALCOMM Co. in U.S.A. and one of chips for executing the same function as that of the "MSM2300" chip.

Figure 2:
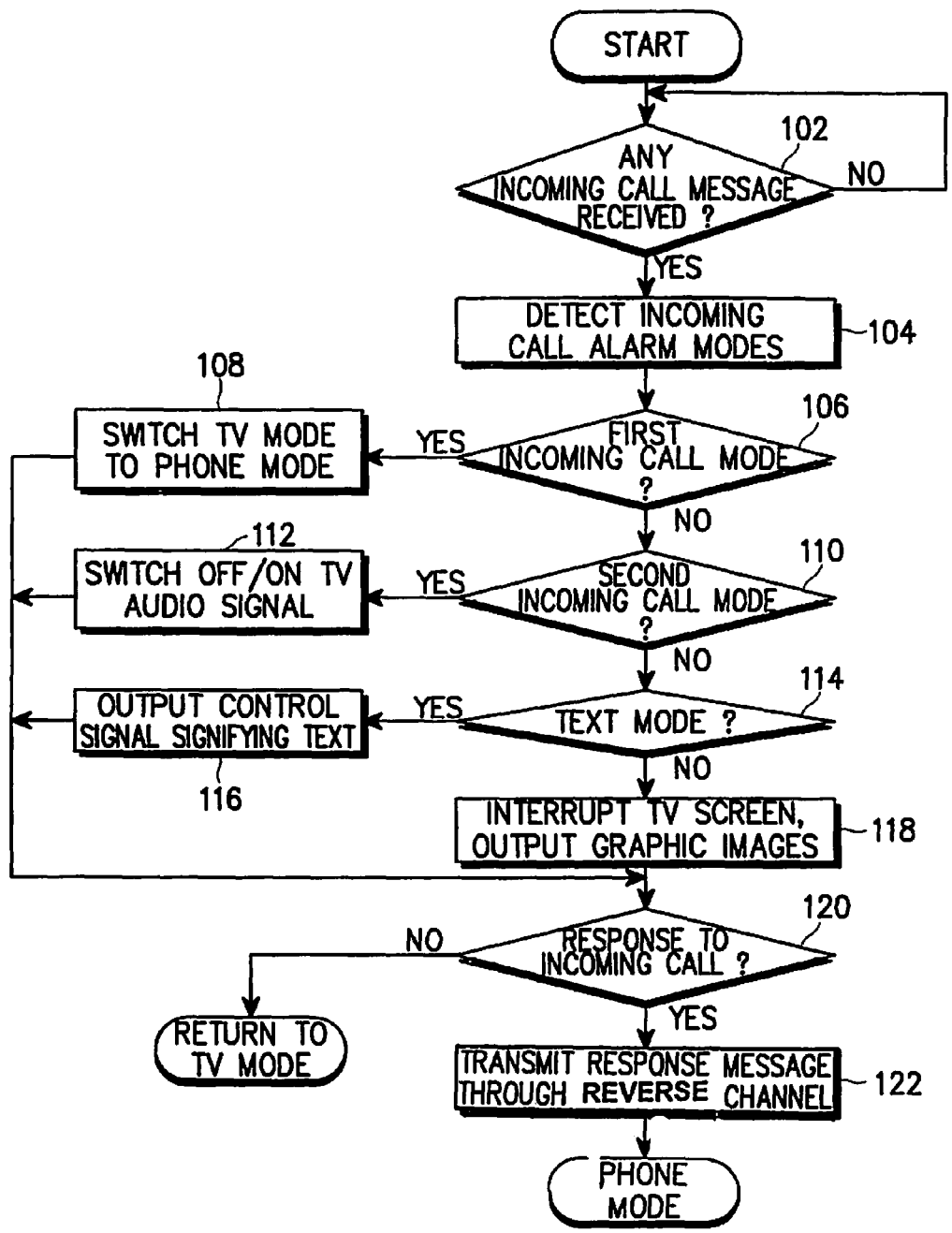
FIG. 2 is a flowchart illustrating the process of displaying an incoming call message of the TV phone according to an embodiment of the present invention.

FIG. 2 is a flowchart illustrating the process of indicating an incoming call message on a TV phone according to an embodiment of the present invention, in which a user is informed of an incoming call state upon the reception of an incoming call message while in the TV mode. A program for the flowchart is stored in a memory block of the MSP 30 as shown in FIG. 1.

A call alarm operation in TV mode upon the occurrence of an incoming call will be described in detail hereinafter with reference to FIGS. 2, 3A, and 3B.

Referring now to FIG. 2, in TV mode where a user watches the TV program of a desired channel on the TV phone, the MSP 20 monitors an output of the MRFU 18 at predetermined time intervals to determine at step 102 whether or not any incoming call message has been received. If it is determined at step 102 that no incoming call or message has been received, the MSP 20 continues to operate in TV mode.

On the other hand, if it is determined at step 102 that the MRFU 18 has received incoming call or message, the program proceeds to step 104 at which the MSP 30 detects the incoming call alarm modes set in the memory therein. The incoming call alarm modes herein means the above-mentioned first, second and third incoming call alarm modes. The MSP 20 determines at steps 106, 110 and 114 of FIG. 2 whether or not the present incoming call mode is any one of the first to third incoming call modes. If it is determined at step 106 that the present incoming call mode is the first incoming call mode (i.e., a bell mode), the program proceeds to step 108, where the MSP 20 disables the power supply control signal TVCTL supplied to the switch 31 so that it interrupts the power supply voltage supplied to the TV module 16, and turns the control signal IDLE supplied to the RFSW 14 to the logic "low" state, which allows the antenna 12 to be disconnected from the first port P1 of the RFSW 14. In this call alarm mode, a telephone bell is driven by the incoming call. And then, if it is determined at step 120 that the user wishes to respond to the incoming call, the program proceeds to step 122 in which the MSP 20 transmits a response message through a reverse channel.

If it is determined at step 110 that the present incoming call alarm mode is the second incoming call alarm mode (i.e., a vibration mode), the program proceeds to step 112 at which the MSP 20 switches the switch 33 connected to an audio output node of the demodulator 36 at predetermined intervals to switch an output of a TV audio signal. For example, the audio output could be turned on and then off every half second. Therefore, when an incoming call mode is set to the second incoming call mode, an audio signal is intermittently cut off while the TV image continues to be outputted, thereby audibly informing the user viewing the TV program of an incoming call state.

If it is determined at steps 106 and 110 that the present incoming call mode is not set to the first or second incoming call mode, the program proceeds and the MSP 20 decides that it is in the third incoming call alarm mode. Within the third incoming call alarm mode, there are two different modes of display: text and graphic image.

FIGS. 3A and 3B illustrate schematically examples of displaying an incoming call message on a viewing screen of a display unit of the TV phone according to an embodiment of the present invention. FIG. 3A illustrates a character message, signifying an incoming call, displayed on a specific region of a viewing screen of the display unit, for example, at the lower end portion. FIG. 3B illustrates a preset graphic image including an image character message of "you're wanted on the phone" displayed on the entire portion of the viewing screen thereof.

At step 114, the MSP 20 determines whether or not the present incoming call mode is set to the text mode. The text mode displays an incoming call message at the lower end portion of the viewing screen like the oblique line shown in FIG. 3A. If it is determined at step 114 that the third incoming call alarm mode is set to text mode, the program proceeds to step 116 where the MSP 20 supplies the OSD processor 44 with a control signal signifying a text. In response, the OSD processor 44 generates the interrupt signal INT for application to the display control section 42. The display control section 42 analyzes the control signal signifying a text stored in the latch register 46 of the OSD processor 44 and accesses the flash memory 38 to allow the flash memory 38 to output text data corresponding to the text signifying control signal for application to the OSD processor 44. The processor 44 stores the text data inputted thereto from the display control section 42 in the video memory 40. Also, the OSD processor 44 synchronizes the text data stored in the video memory 40 with the composite synchronizing signal CSYNC to output the synchronized text signal as a video signal of RGB at the lower end portion of a horizontal line. The LCDD 24, which is coupled to the OSD processor 44, supplies the video signal of RGB outputted from the OSD processor 44 to the TFT-LCD 26, which displays the video signal at the lower end portion of a image viewing screen as shown in FIG. 3A.

It should be noted that the display control section 42 and the OSD processor 44 controls the text data so that they can be displayed at the lower end portion of a field or a frame as described above. In addition, it is preferable that the text data is an image character message of "you're wanted on the phone". The oblique line portion as shown in FIG. 3A is a region on which any message notifying the viewer of an incoming call is displayed, and the remaining portion, except the oblique line portion, is a region on which the TV image is displayed.

If, on the other hand, it is determined at step 114 that the third incoming call alarm mode is not set to the text mode, the program proceeds to step 118 where the MSP 20 transmits a graphic data displaying command to the display control section 42 through the OSD processor 44. The display control section 42 accesses the flash memory 38 and directs the flash memory 38 to output the graphic data for displaying an incoming call graphic to the OSD processor 44, which stores the inputted graphic data in the video memory 40. The OSD processor 44 synchronizes the graphic data stored in the video memory 40 with the composite synchronizing signal CSYNC to output the synchronized signal as a video signal of RGB at the lower end portion of a horizontal line. The LCDD 24, which is coupled to the OSD processor 44, supplies the video signal of RGB outputted from the OSD processor 44 to the TFT-LCD 26, which displays the TV image with the graphic data superimposed on top. The image viewing screen with the superimposed graphic data is as shown in FIG. 3B.

Accordingly, it can be seen that if the incoming call alarm mode is set to the third incoming call mode, either a character message signifying the incoming call or images signifying there is an incoming call, such as the combination of the telephone graphic and the character message of "you're wanted on the phone", is displayed either at the lower end portion of the image viewing screen or the entire portion of the image viewing screen, thereby informing a user of an incoming call state, even while the TV audio sound is continually reproduced and outputted.

At subsequent step 120, the MSP 20 determines whether or not the user responds to the incoming call. This can be implemented by detecting if a signal corresponding to the input of the SEND key on the keypad 30 is generated. For a flip type portable phone, the user's response to the incoming call can be detected through the opening of the flip of the portable phone. If it is determined at step 120 that the user responds to the incoming call, the program proceeds to step 122 where the MSP 20 transmits an incoming call response message through the MRFU 16 to a base station in order to enter the phone mode. On the other hand, if is determined at step 120 that the user does not respond to the incoming call, the operation mode of the TV phone remains in TV mode.

As apparent from the above description, the TV phone of the present invention provides many advantages. When in TV mode, a user can be informed of an incoming call by stopping the operation of a TV module; switching off and on output of an audio signal of the selected TV broadcasting channel; displaying a character message at the lower end portion of the TV viewing screen; or superimposing a graphic image over the image on the TV viewing screen, thereby accurately informing the user that a call has been received and allowing the user to rapidly answer the telephone.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An apparatus comprising:
    a communication module to communicate with an external electronic device; and
    a controller operatively coupled with the communication module, the controller configured to:
        present multimedia content via a display operatively coupled with the controller;
        receive, using the communication module, an incoming event from the external electronic device; and
        automatically pause displaying at least one portion of the multimedia content or automatically pause outputting an audio signal corresponding to the multimedia content based on receiving the incoming event.

2. The apparatus of claim 1, wherein the controller is further configured to:
    receive, using the communication module, data corresponding to the multimedia content from another external electronic device.

3. The apparatus of claim 1, wherein the controller is further configured to:
    output, via a speaker operatively coupled with the controller, an audio signal corresponding to the at least one portion of the multimedia content based on the pausing of the displaying.

4. The apparatus of claim 1, wherein the controller is further configured to:
    output, via a speaker operatively coupled with the controller, another audio signal corresponding to the incoming event based on the pausing of the outputting.

5. The apparatus of claim 1, wherein the controller is further configured to:
    present, via the display or a speaker operatively coupled with the controller, a notification corresponding to the incoming event.

6. The apparatus of claim 5, wherein the controller is further configured to:
    concurrently display, via the display, the notification and the multimedia content at least temporarily.

7. The apparatus of claim 5, wherein the notification comprises a text, a character, a graphic image, an image character, a vibration of the apparatus, or any combination thereof.

8. The apparatus of claim 5, wherein the notification comprises an icon, an image, a text, or a symbol representing an address corresponding to a short message service, a phone number, or an email address.

9. The apparatus of claim 1, wherein the incoming event comprises a call event, a short message event, a multimedia message event, or any combination thereof.

10. The apparatus of claim 1, wherein the controller is further configured to:
    determine whether the incoming event is responded to by the apparatus within a specified period of time; and
    resume the displaying of the at least one portion or the outputting of the audio signal based on a determination that the incoming event has not been responded to by the apparatus within the specified period of time.

11. The apparatus of claim 10, wherein the controller is configured to:
    refrain from the resuming based on a determination that the incoming event has been responded to by the apparatus within the specified period of time.

12. An apparatus comprising:
    a communication module to communicate with an external electronic device; and
    a controller operatively coupled with the communication module, the controller configured to:
        present multimedia content using a first user interface via a display operatively coupled with the controller;
        receive, using the communication module, an incoming event from the external electronic device; and
        automatically switch from the first user interface to a second user interface to reply the incoming event based on receiving the incoming event.

13. The apparatus of claim 12, wherein the controller is further configured to:
    automatically stop displaying of at least one portion of the multimedia content or automatically stop outputting of an audio signal corresponding to the multimedia content; and
    output another audio signal corresponding to the incoming event.

14. The apparatus of claim 12, wherein at least one of the first user interface, or the second user interface comprises a text, a character, a graphic image, an image character, or any combination thereof.

15. The apparatus of claim 12, wherein at least one of the first user interface, or the second user interface comprises an icon, an image, a text, or a symbol representing an address corresponding to a short message service, a phone number, or an email address.

16. The apparatus of claim 12, wherein the incoming event comprises a call event, a short message event, a multimedia message event, or any combination thereof.

17. The apparatus of claim 12, wherein the controller is further configured to:
    determine whether the incoming event is responded to by the apparatus within a specified period of time; and
    return to the first user interface based at least in part on a determination that the incoming event has not been responded to by the apparatus within the specified period of time.

18. A machine-readable storage device storing instructions that, when executed by one or more processors, cause the one or more processors to perform operations comprising:
    presenting, at an electronic device including a communication module, multimedia content via a display operatively coupled with the one or more processors of the electronic device;

receiving, using the communication module, an incoming event from an external electronic device; and automatically pausing, at the electronic device, displaying at least one portion of the multimedia content or automatically pausing outputting an audio signal corresponding to the multimedia content based on receiving the incoming event.

19. The machine-readable storage device of claim 18, wherein the operation of automatically pausing displaying at least one portion of the multimedia content comprises:

outputting, via a speaker operatively coupled with the one or more processors, an audio signal corresponding to the at least one portion of the multimedia content based on the pausing of the displaying.

20. The machine-readable storage device of claim 18, wherein the operation of automatically pausing outputting the audio signal comprises:

outputting, via a speaker operatively coupled with the one or more processors, another audio signal corresponding to the incoming event based on the pausing of the outputting.

21. The machine-readable storage device of claim 18, wherein the operation of automatically pausing displaying at least one portion of the multimedia content comprises:

presenting, via the display or a speaker operatively coupled with the one or more processors, a notification corresponding to the incoming event.

22. The machine-readable storage device of claim 18, wherein the stored instructions, when executed, further cause the one or more processors to perform operations comprising:

determining whether the incoming event is responded to by the electronic device within a specified period of time; and resuming the displaying of the at least one portion or the outputting of the audio signal based on a determination that the incoming event has not been responded to by the electronic device within the specified period of time.

23. A machine-readable storage device storing instructions that, when executed by one or more processors, cause the one or more processors to perform operations comprising:

presenting, at an electronic device including a communication module, multimedia content using a first user interface via a display operatively coupled with the one or more processors of the electronic device;

receiving, using the communication module, an incoming event from an external electronic device; and automatically switching from the first user interface to a second user interface to reply to the incoming event based on receiving the incoming event.

24. The machine-readable storage device of claim 23, wherein the operation of automatically switching comprises:

automatically stopping displaying of at least one portion of the multimedia content or automatically stopping outputting of an audio signal corresponding to the multimedia content; and outputting another audio signal corresponding to the incoming event.

25. The machine-readable storage device of claim 23, wherein the stored instructions, when executed, further cause the one or more processors to perform operations comprising:

determining whether the incoming event is responded to the electronic device within a specified period of time; and returning to the first user interface based at least in part on a determination that the incoming event has not been responded to by the electronic device within the specified period of time.

* * * * *